United States Patent [19]
Arthur, Jr. et al.

[11] 3,891,621

[45] June 24, 1975

[54] CARBOHYDRATE-BORON ALKOXIDE COMPOUNDS

[75] Inventors: Jett C. Arthur, Jr., Metairie; Malkait S. Bains, New Orleans, both of La.

[73] Assignee: The United States of America as represented by the Secretary of Agriculture, Washington, D.C.

[22] Filed: Oct. 15, 1973

[21] Appl. No.: 406,408

Related U.S. Application Data
[62] Division of Ser. No. 256,021, May 23, 1972, Pat. No. 3,790,562.

[52] U.S. Cl. .................. 260/210 R; 8/180; 8/181; 260/45.7 R; 260/209 R; 260/212 R; 260/231 A; 260/231 R; 260/234 R
[51] Int. Cl. ............................................. C07c 47/18
[58] Field of Search ................. 260/209 R, 210 R

[56] References Cited
UNITED STATES PATENTS
2,453,108  11/1948  Curtis............................ 260/209 R
3,231,561   1/1966  Brunelle et al................. 260/209 R

*Primary Examiner*—Johnnie R. Brown
*Attorney, Agent, or Firm*—M. Howard Silverstein; Max D. Hensley

[57] ABSTRACT

This invention relates to a method for preparing carbohydrate-boron alkoxide compounds. Under anhydrous conditions, stable compounds of methyl-α-D-glucoside, methyl-α-mannoside, sucrose, cellobiose, methyl cellulose, and cellulose and boron alkoxides, such as boron ethoxide, boron prepoxide, and boron isopropoxide, were prepared in neat boron alkoxide, the parent alcohol, benzene, pyridine, and/or ethylenediamine. The method of this invention has as its objective increasing the reactivity of carbohydrates, as their molecular weights increase, with boron alkoxides by treatment in solutions of strong bases, such as pyridine and ethylenediamine. Formation of carbohydrate-boron alkoxide compounds modifies the rate of oxidation of carbohydrates and is related to preparing flame-resistant products.

21 Claims, No Drawings

CARBOHYDRATE-BORON ALKOXIDE COMPOUNDS

This is a division of application Ser. No. 256,021, filed May 23, 1972, now U.S. Pat. No. 3,790,562.

A non-exclusive, irrevocable, royalty-free license in the invention herein described, throughout the world for all purposes of the United States Government, with the power to grant sublicenses for such purposes, is hereby granted to the Government of the United States of America.

This instant invention relates to a process for the preparation of carbohydrate--boron alkoxide products.

The method of this invention has as its objective increasing the reactivity of carbohydrates, particularly as their molecular weights increase, with boron alkoxides. As the molecular weight of the carbohydrate increased, its reaction with boron alkoxides neat, in benzene, or in the parent alcohol did not occur or decreased to a very low extent of reaction. It was found that in pyridine or ethylenediamine, the reactivity of carbohydrates toward boron alkoxides increased. Further it was observed that cellulose did not react with the neat alkoxides and reacted with them in pyridine to only a small extent; in ethylenediamine cellulose, both ground and in fiber form, reacted with the alkoxides.

Developments in the commerical use of boron containing compounds, applied to cellulosic textile materials, to modify the rate of oxidation of textiles thereby imparting flame resistance to cellulosic products, have been reported in the literature. Also, the ionization of boric acid is increased in solutions containing carbohydrates. This effect has been used to separate borate complexes of carbohydrates by differential elution from columns of ion exchange resins or by paper ionophoresis. Alkyl borates of carbohydrates are used in Friedel-Crafts reactions to make useful organic compounds.

The instant invention defines methods for the preparation of stable compounds of methyl-$\alpha$-D-glucoside, methyl-$\alpha$-D-mannoside, sucrose, cellobiose, methyl cellulose, and cellulose and boron alkoxides, such as boron ethoxide, boron propoxide, and boron isopropoxide. Unexpectedly, it was found that carbohydrates, having a high molecular weight such as purified cotton cellulose (molecular weight 700,000), could be reacted in strong bases, such as ethylenediamine, with boron alkoxides under anhydrous conditions to yield stable compounds. Reaction products of boron alkoxides and carbohydrates are apparently Lewis acids whose properties may be related to the electrophilic character of the glucopyranoside ring. Boron alkoxides are generally electron deficient and would tend to withdraw electrons from the glucopyranoside ring, normally an electron sink. These effects would likely decrease the rate of oxidation of the ring.

The following examples are provided to illustrate the invention and are not intended to limit the invention in any manner whatever.

EXAMPLE 1

Methyl-$\alpha$-D-glucoside (8 g) and boron isopropoxide (25 ml) were added to benzene (100 ml) in a flask (200 ml) fitted with a small column and distillation head. The solution was then boiled at reflux; isopropanol formed was removed by azeotropic distillation. When isopropanol was no longer formed, the remaining volatiles were removed at 100°C/0.3 torr. The solid product was analyzed. Anal. Calc. for $[CH_3]$ $[C_6H_7O_6]$ $[B(OC_3H_7)_2]_4$: B, 6.13 Found: B, 6.12 percent. This product was soluble in benzene after two months of storage.

When this product was heated for about 2 hours at 100°C/0.3 torr, two molecules condensed to yield boron isopropoxide and $[B(OC_3H_7)_2]$ $[B(OC_3H_7)]$ $[CH_3]$ $[C_6H_7O_6]$ $[B(OC_3H_7)]$ $[C_6H_7O_6]$ $[CH_3]$ $[B(OC_3H_7)]$ $[B(OC_3H_7)_2]$. Anal. Calc.: B, 6.38; $OC_3H_7$, 48.8. Found: B, 6.43; $OC_3H_7$, 49.1 percent.

EXAMPLE 2

Methyl-$\alpha$-D-mannoside (5 g) and boron isopropoxide (25 ml) were added to benzene (100 ml) in a flask as described above. The solution was then boiled at reflux; isopropanol formed was removed by azeotropic distillation. The remaining volatiles were removed at 100°C/0.3 torr. The solid product was analyzed. Anal. Calc. for $[CH_3]$ $[C_6H_7O_6]$ $[B(OC_3H_7)_2]_4$: B, 6.13. Found: B, 6.09 percent.

This product was dissolved in a minimum amount of benzene at 78°C. Petroleum ether was added, until a small precipitate was formed. The solution was cooled to 25°C, and a white product, yield about 80 percent, was obtained. After isolation, this product was not completely soluble in benzene at 25°C. The soluble fraction was recovered as solid after removing the benzene at 25°C/0.3 torr. Anal. Calc. for $[CH_3]$ $[C_6H_7O_6]$ $[B(OC_3H_7)]_2$: B, 6.56. Found: B, 6.62 percent.

EXAMPLE 3A

Sucrose (3 g) was dissolved in pyridine (50 ml) at 70°C. Boron propoxide (25 ml) and benzene (25 ml) were added to the solution which was then boiled at reflux. Propanol formed as removed by azeotropic distillation. The remaining volatiles were removed at 40°C/0.3 torr. The solid product was analyzed. Anal. Calc. for $[C_{12}H_{14}O_{11}]$ $[B(OC_3H_7)_2]_8$: B, 6.33. Found: B, 6.39 percent.

Ethylenediamine (10 ml) was added to this product at 70°C. Then volatiles were removed at 40°C/0.3 torr. Anal. Calc. for $[C_{12}H_{14}O_{11}]$ $[B(OC_3H_7)]_8$ $[N_2C_2H_6]_4$: B, 7.69; $N_2C_2H_6$, 20.64. Found: B, 7.65; $N_2C_2H_6$, 20.77 percent.

EXAMPLE 3B

Sucrose (3 g) was dissolved in pyridine (35 ml) at 70°C. Boron propoxide (25 ml) was added. Then the solution was allowed to stand overnight at 25°C. A white solid product formed. The volatiles were removed at 50°C/0.3 torr. The product was not soluble in benzene. When boron propoxide (10 ml) was added and the solution was heated to 80°C, the product dissolved. The solution was filtered through a sintered glass apparatus. Then the volatiles were removed at 50°C/0.3 torr. Anal. Calc. for $[C_{12}H_{14}O_{11}]$ $[B(OC_3H_7)]_4$: B, 7.05. Found: B, 6.97 percent.

EXAMPLE 3C

Sucrose (2 g) was dissolved in pyridine (25 ml) at 70°C. Boron isopropoxide (20 ml) saturated with ethylenediamine was added at 70°C. Then the solution was boiled at reflux for 10 h. The volatiles were removed at 60°C/0.3 torr. The product was analyzed. Anal. Calc. for $[C_{12}H_{14}O_{11}]$ $[B(OC_3H_7)]_4$ $[N_2C_2H_6]$: B, 6.47; $N_2C_2H_6$, 8.68. Found: B, 6.84; $N_2C_2H_6$, 8.91 percent.

EXAMPLE 3D

Sucrose (2 g) was dissolved in ethylenediamine (15 ml) at 70°C. Boron propoxide (25 ml) was added. On cooling a solid product formed. The clear supernatant was decanted, then the remaining volatiles were removed at 70°C/0.3 torr. Anal. Calc. for $[C_{12}H_{18.5}O_{11}][B(OC_3H_7)_2]_{2.5}[N_2C_2H_6]_{2.5}$: B, 3.35; $N_2C_2H_6$, 17.97. Found: B, 3.33; $N_2C_2H_6$, 17.67 percent.

EXAMPLE 4

Cellobiose (2 g) was dissolved in pyridine (50 ml) at 110°C. Boron ethoxide (50 ml) was added to the solution dropwise over a period of 30 minutes. To this clear solution, after 60 minutes, benzene (30 ml) was added. The solution was boiled at reflux and liquid (35 ml) was removed dropwise. The solution was cooled to 25°C and the supernatant liquid decanted. The solid residue was dissolved in benzene (25 ml) and boron ethoxide (10 ml); then the reaction mixture was heated at 90°C for 2 h. The mixture was cooled to 25°C and the supernatant liquid decanted. The remaining volatiles were removed at 70°C/0.3 torr. Anal. Calc. for $[C_{12}H_{14}O_{11}][B(OC_2H_5)]_3[B(OC_2H_5)_2]_2$: B, 7.69; $OC_2H_5$, 44.82. Found: B, 7.76; $OC_2H_5$, 47.35 percent.

EXAMPLE 5A

Methyl cellulose (5 g) and boron ethoxide in ethanol (75 ml of 70 percent solution) were added to benzene (100 ml) and then boiled at reflux. Ethanol was removed by azeotropic distillation. The remaining volatiles were removed at 100°C/0.3 torr. Anal. Found: B, 6.98 percent. This concentration of B would require trisubstitution of cellulose, as follows: Calc. for $[C_6H_9O_6][B(OC_2H_5)_2]_3$: B, 6.76 percent. This would indicate that the methoxyl groups were cleaved during the reaction and removed as methanol from the solution. Alternatively, a boron ethoxide cyclic complex with methyl cellulose could be formed to yield a product containing the amount of B found.

EXAMPLE 5B1

Methyl cellulose (5 g) and boron propoxide (50 ml) were boiled at reflux (about 130°C) for 5 hr. Then benzene (25 ml) was added, and the propanol removed by azeotropic distillation. The remaining volatiles were removed at 100°C/0.3 torr. Anal. Found: B, 2.02 percent. This concentration of B would require as follows: Calc. for $[C_6H_{9.8}O_{4.3}][OCH_3]_{1.7}[B(OC_3H_7)_2]_{0.5}$: B, 2.02 percent.

EXAMPLE 5B2

The product of Example 5B1 was mixed with the distillate, and boron propoxide (20 ml) was added. The mixture was boiled at reflux (about 130°C) for 8 h. Anal. Found: B, 2.85 percent. This concentration of B would require, as follows: Calc. for $[C_6H_{9.5}O_{4.3}][OCH_3]_{1.7}[B(OC_3H_7)_2]_{0.8}$: B, 2.83 percent. Repetition of the above procedure did not increase the concentration of B in the product.

EXAMPLE 5B3

The product of Example 5B2 was mixed with pyridine (25 ml) for 2 minutes and then boron propoxide (50 ml) was added. The solution was boiled at reflux (about 130°C) for 1 h, and then distillate (25 ml) was collected dropwise. The remaining volatiles were removed at 100°C/0.3 torr. Anal. Found: B, 4.10 percent. This concentration of B would require complete substitutution as follows: Calc. for $[C_6H_9O_{4.3}][OCH_3]_{1.7}[B(OC_3H_7)_2]_{1.3}$: B, 3.80 percent.

Example 5C1

Methyl cellulose (3.4 g), boron isopropoxed (25 ml) and pyridine (25 ml) were boiled at reflux for 2 minutes. Then the volatiles were removed at 100°C/0.3 torr. Anal. Found: B, 3.50 percent. This concentration of B would require as follows: Calc. for $[C_6H_{9.2}O_{4.3}][OCH_3]_{1.7}[B(OC_3H_7)_2]_{1.1}$: B, 3.45 percent.

EXAMPLE 5C2

The product of Example 5C1 was combined with the distillate and then boiled at reflux. About one-third of the distillate was collected dropwise; then the remaining volatiles were removed at 100°C/0.3 torr. Anal. Found: B, 4.02; $OC_3H_7$, 42.97 percent. These concentrations would require complete substitution, as follows: Calc. for $[C_6H_9O_{4.3}][OCH_3]_{1.7}[B(OC_3H_7)_2]_{1.3}$: B, 3.80; $OC_3H_7$, 41.48 percent.

EXAMPLE 6A1

Cotton cellulose (3.5 g), ground to pass a 20-mesh screen, was added to pyridine (30 ml). After 15 minutes at 25°C, boron propoxide (40 ml) was added, and the mixture was boiled at reflux for 20 minutes. Then distillate (25 ml) was removed dropwise at 130°C. The remaining volatiles were removed at 100°C/0.3 torr. Anal. Found: B, 0.71 percent. This concentration of B would require, as follows: Calc. for $[C_6H_{9.88}O_5][B(OC_3H_7)_2]_{0.12}$: B, 0.70 percent.

EXAMPLE 6A2

To a fraction of the above product (3 g), ethylenediamine (10 ml) was added. After 15 minutes at 25°, boron propoxide (50 ml) was added. The mixture was boiled at reflux and distillate (20 ml) was removed dropwise at 130°C. The remaining volatiles were removed at 100°C/0.3 torr. Anal. Found: B, 4.06; $C_2N_2H_6$, 11.54 percent. These concentrations would require, as follows: Calc. for $[C_6H_{8.5}O_5][B(OC_3H_7)_2]_{1.5}[C_2N_2H_6]_{0.75}$: B, 4.08; $C_2N_2H_6$, 10.96 percent.

EXAMPLE 6B

Cotton cellulose (5 g) in fiber form was added to pyridine (50 ml). After 15 minutes at 25°C, boron isopropoxide (50 ml) was added, and the mixture boiled at reflux for 4 h. Benzene (25 ml) was added, and the mixture was boiled at reflux for 3 h. The isopropanol formed was removed by azeotropic distillation. Then the mixture was boiled at reflux overnight (17 h). Benzene (25 ml) was added, and the isopropanol formed was removed by azeotropic distillation. The remaining volatiles were removed at 100°C/0.2 torr. Anal. Found: B, 0.31 percent. This concentration of B would require, as follows: Calc. for $[C_6H_{9.95}O_5][B(OC_3H_7)_2]_{0.05}$: B, 0.32 percent.

EXAMPLE 6C

Cotton cellulose (5 g) in fiber form was added to ethylenediamine (50 ml), benzene (100 ml), and ethanol (15 ml). The mixture was *boiled* at *reflux for 5 h*, during which time the water — ethanol — benzene azeotrope was removed by distillation. Then boron propoxide (50 ml) was added, and the mixture was boiled at reflux for 23 h. At this time boron propoxide (25 ml) was added, and the mixture boiled at reflux for an additional 2 h. After cooling to 25°C the liquid was decanted and the reaction product was washed three times with benzene (50 ml each time); the liquid was decanted after each washing. Then the product was washed with petroleum ether (50 ml). The liquid was decanted and the remaining volatiles were removed at 50°C/0.3 torr. Anal. Found: B, 3.63; $C_2N_2H_6$, 18.86 percent. These concentrations would require as follows: Calc. for $[C_6H_{8.5}O_5]$ $[B(OC_3H_7)_2]_{1.5}$ $[C_2N_2H_6]_{1.5}$: B, 3.68; $C_2N_2H_6$, 19.74 percent.

We claim:

1. A method of making glucopyranoside-boron alkoxide compounds, the process comprising:
   a. drying a glucopyranoside,
   b. adding a boron alkoxide selected from the group of boron ethoxide, boron propoxide and boron isopropoxide and/or the corresponding ethanol, propanol or isopropanol and/or an organic base selected from the group of pyridine and ethylenediamine.
   c. refluxing the mixture of step (b) for a period of time sufficient to yield glucopyranoside-boron alkoxide,
   d. removing by azeotropic distillation the alcohol produced in step (c),
   e. removing the remaining volatiles from the product of step (d) by heating the product under partial vacuum, and
   f. recovering the glucopyranoside-boron alkoxide.

2. A process for making methyl-alpha-D- glucoside-boron isopropoxide having the empirical formula $[CH_3]$ $[C_6H_7O_6]$ $[B(OC_3H_7)_2]_4$, the process comprising
   a. mixing 8 g of methyl-alpha-D-glucoside with about 25 ml of boron isopropoxide and 100 ml of benzene,
   b. refluxing the mixture and removing the isopropanol formed by azeotropic distillation, and
   c. removing the remaining volatiles by distilling at 100°C/0.3 torr, to obtain the dry methyl-alpha-D-glucoside-boron isopropoxide.

3. The dry methyl-α-D-glucoside-boron isopropoxide produced by the process of claim 2.

4. A process for making a condensate of the product of claim 3 and having the empirical formula $[B(OC_3H_7)_2]$ $[B(OC_3H_7)]$ $[CH_3]$ $[C_6H_7O_6]$ $[B(OC_3H_7)]$ $[C_6H_7O_6]$ $[CH_3]$ $[B(OC_3H_7)]$ $[B(OC_3H_7)_2]$, the process comprising heating the dry product of claim 3 for about 2 hours at 100°C/0.3 torr.

5. The condensate product produced by the process of claim 4.

6. A process for making methyl-α-D-mannoside-boron isopropoxide having the empirical formula $[CH_3]$ $[C_6H_7O_6]$ $[B(OC_3H_7)_2]_4$, the process comprising:
   a. mixing 5 g of methyl-α-D-mannoside with about 25 ml of boron isopropoxide and 100 ml of benzene,
   b. refluxing the mixture and removing the isopropanol formed by azeotropic distillation, and
   c. removing the remaining volatiles at about 100°C/0.3 torr.

7. The methyl-α-D-mannoside—boron isopropoxide produced by the process of claim 6.

8. A process for making the condensate of methyl-alpha-D-mannoside--boron isopropoxide having the empirical formula $[CH_3]$ $[C_6H_7O_6]$ $[B(OC_3H_7)]_2$, the process comprising:
   a. dissolving the product of claim 7 in benzene at 78°C,
   b. adding petroleum ether until a small quantity of precipitate is formed,
   c. cooling the petroleum ether solution to room temperature to obtain a white solid precipitiate which is partially soluble in benzene, and
   d. removing the benzene by distilling at 25°C/0.3 torr.

9. The condensate produced by the process of claim 8.

10. A process for making a sucrose—boron propoxide having the empirical formula $[C_{12}H_{14}O_{11}]$ $[B(OC_3H_7)_2]$, the process comprising:
    a. dissolving 3 g of sucrose in about 50 ml of pyridine at about 70°C,
    b. adding about 25 ml of boron propoxide and about 25 ml of benzene to the mixture of (a),
    c. refluxing the mixture and removing the propanol formed by azeotropic distillation, and
    d. removing the remaining volatiles upon heating the remaining mixture at 40°C/0.3 torr.

11. The sucrose—boron propoxide produced by the process of claim 10.

12. A process for making a sucrose—boron propoxide having the empirical formula $[C_{12}H_{14}O_{11}]$ $[B(OC_3H_7)]_8$ $[N_2C_2H_6]_4$, the process comprising:
    a. adding about 10 ml of ethylenediamine to the product of claim 11 at about 70°C, and
    removing the volatiles upon heating the mixture at about 40°C/0.3 torr.

13. The sucrose-boron propoxide produced by the process of claim 12.

14. A process for making sucrose—boron propoxide having the empirical formula $[C_{12}H_{14}O_{11}]$ $[B(OC_3H_7)]_4$, comprising:
    a. dissolving about 3 g of sucrose in about 35 ml of pyridine at about 70°C,
    b. adding about 25 ml of boron propoxide to the dissolved sucrose of (a) and setting aside for a period of about 12 hours, at room temperature, to form a white solid product,
    c. removing the volatiles by heating the mixture of (b) at about 50°C/0.3 torr,
    d. adding boron propoxide to dissolve the product of step (c) and heating to about 80°C, and
    e. repeating step (c).

15. The sucrose—boron propoxide produced by the process of claim 14.

16. A process for making sucrose--boron isopropoxide having the empirical formula $[C_{12}H_{14}O_{11}]$ $[B(OC_3H_7)]_4$ $[N_2C_2H_6]$, comprising:
    a. dissolving about 2 g of sucrose in about 25 ml of pyridine,
    b. adding a solution comprising 20 ml boron isopropoxide saturated with ethylenediamine and heating to about 70°C,
    c. mixing the solution of (a) and (b) while (b) is still hot,
    d. refluxing the mixture for about 10 hours, and
    e. removing the volatiles at 60°C/0.3 torr.

17. The sucrose—boron isopropoxide produced by the process of claim 16.

18. A process for making sucrose-boron propoxide having the empirical formula $[C_{12}H_{19.5}O_{11}]$ $[B(OC_3H_7)_2]_{2.5}$ $[N_2C_2H_6]_{2.5}$, comprising:
 a. dissolving 2 g sucrose in about 15 ml ethylenediamine at about 70°C,
 b. adding about 25 ml boron propoxide to the solution of (a),
 c. cooling the mixture of (b) to form a solid product and decanting the supernatant, and
 d. removing the volatiles upon heating at 70°C/0.3 torr.

19. The sucrose—boron propoxide produced by the process of claim 18.

20. A process for making cellobiose--boron ethoxide having the empirical formula $[C_{12}H_{14}O_{11}]$ $[B(OC_2H_5)]_3$ $[B(OC_2H_5)_2]_2$, the process comprising:
 a. dissolving 2 g of cellobiose in about 50 ml of pyridine at 110°C,
 b. adding dropwise, over a period of 30 minutes about 50 ml of boron ethoxide to the solution of (a), and cooling for about 60 minutes,
 c. adding about 30 ml of benzene and refluxing for time required to remove dropwise about 35 ml of the lower phase liquid and cooling the remainder to about 25°C, obtaining a solid and a supernatant,
 d. removing the supernatant liquid,
 e. dissolving the solid in a solution made up of about 25 ml benzene and 10 ml boron ethoxide,
 f. heating the dissolved reaction mixture for 2 hours at 90°C, the cooling to room temperature, and
 g. removing the supernatant liquid, then removing the volatiles upon heating at 70°C/0.3 torr.

21. The cellobiose—boron ethoxide produced by the process of claim 20.

* * * * *